Patented July 17, 1951

2,560,650

UNITED STATES PATENT OFFICE 2,560,650

PROCESS FOR MODIFYING, SOLIDIFYING, AND INSOLUBILIZING ASPHALTS

Max Kronstein, New York, N. Y.

No Drawing. Application September 1, 1948, Serial No. 47,347

16 Claims. (Cl. 196—22)

This application is related to my copending application Ser. No. 33,676, filed June 17, 1948, and now abandoned for "Methods of Insolubilizing and Solidifying Fatty Acid Esters of Alcohols and Products Produced Thereby," which is directed to the treatment of fatty acid esters of alcohols; whereas the present invention relates to the treatment of petroleum asphalts which, in spite of their different chemical structure and composition, may likewise be treated to produce insoluble, infusible, solidified, chemically resistant products according to my discoveries.

Thus, the present invention relates to a process for the solidification and insolubilization of a class of compounds and compositions known as petroleum asphalts which comprises treating said asphalts with potentially free oxygen-yielding compounds known as per compounds whereby solidified products may be obtained which are insoluble in the usual petroleum asphalt solvents such as coal tar and petroleum solvents. The present invention further has particular relation to a step-by-step insolubilization of petroleum asphalts by treatment with per compounds whereby intermediate products of predetermined and varied physical and chemical characteristics may be obtained.

It is known that asphalts can be modified by blowing them at elevated temperatures with air. This process is characterized by an air blowing of the heated asphalt which must be continued for many hours. The final products vary widely; that is, they very often exhibit a lack of uniformity in their physical and chemical characteristics. Attempts have been made to shorten such treatments by adding such substances as dinitrophenols which are expected to enter the reaction for modifying the asphalt.

It has generally been assumed that such modification consists in a slowly progressing dehydrogenation, whereby the blowing current of air or the oxygen of the hydroxyl groups of the added chemicals is considered to take at least one hydrogen atom out of the asphalt compound and result in a formation of water. Nevertheless, even those skilled in the art have conceded the fact that there is very little actual proof for such an assumption. However, since it has been assumed that the modification of the petroleum asphalt is based on such dehydrogenation, the oxygen, where it has been applied as blowing matter or a part of an added chemical, has been expected to perform or to promote such water formation from the asphalt.

The present invention is not concerned if, and to what extent dehydrogenation of the asphalt occurs during the process. As set forth in my aforesaid application, the present invention is not concerned with the use of oxygen as an oxidation agent, although oxidation may occur as a side reaction. Actually the free active oxygen released by the per compound acts as a promoter in the formation of a solid, insoluble, infusible form of the asphalt matter, which begins and progresses in the bulk of the asphalt compound and modifies it by its formation. If the process is carried on far enough, practically the entire bulk of the substance can be obtained in such a state of insolubilization and solidification that it can be separated readily from the not yet insolubilized substance by dissolving the still soluble parts from the bulk of the insoluble reaction product.

Inasmuch as the present process utilizes the oxygen only in its free and active state, the invention has no application in a process below a condition where such free oxygen is not at least released slowly from the per compound. For example, the asphalt must be heated at least to a melting or liquid state and the catalyst must be of such type that it will be capable of releasing its free oxygen into the bulk of the asphalt at or near such melting temperature. Where the release of the free oxygen-yielding catalyst is bound to a particular temperature range which is characteristic of the particular catalyst employed, the temperature of the process must be such that at least a gradual release of the free oxygen can be achieved. However, the present invention permits heating of the asphalt compounds above the release temperature of the free oxygen-yielding catalyst, since such a continued heating promotes a uniform distribution of the reaction product in the asphalt compound and promotes an evaporation of by-products which may be formed by the catalytic treatment.

It will be understood that even under conditions of continued heating, with or without additional use of air blowing, modification of the asphalts will continue and that such heating or air-blowing of an asphalt composition, modified in accordance with the present process, merely seems to modify the product in a manner similar to that wherein the asphalt composition previously has been modified in accordance with the present invention and subsequently air-blown or heated in the conventional manner.

Accordingly, an object of my invention is to solidify asphalts such as blowing fluxes, most of which are generally used for pavements, roofing materials, water-proofing, insulating, etc. These asphalts may comprise a naturally occurring mixture of hydrocarbons, such as pitch or bitumens, or they may be produced synthetically, such as by the oxidation of high boiling mineral oils or residues of destructive distillation, decomposition products, etc. More particularly, it is an object of my invention to effect this solidification directly within a short time and by the application of a minimum amount of heat.

A further object is to prepare an asphalt base composition which can be readily insolubilized by the mere application of moderate heat.

A still further object is to prepare such a composition, adapted to be applied to a base, as by painting, dipping, spreading, spraying, impregnating, or by other known modes of application, in such manner that the coating can then be heated after being applied to the base and thereby be insolubilized and solidified directly onto the base Another object is to transfer the said asphalts into a state or condition wherein the components thereof no longer stick together inseparably after being insolubilized, whereby the insolubilized components can readily be obtained.

Another object is to provide a process which will enable the ready separation of the insolubilized components of the said compounds from the non-insolubilized components whereby to eliminate the latter components which may impart unfavorable or undesirable characteristics to said compositions.

Another object is to provide a physical process whereby the novel compositions forming a part of this invention may be contacted with suitable solvents or swelling liquids in such manner that the various components of the composition do not stick in cohesive fashion, but can be readily separated in either a liquid or solid state without substantial mechanical effort.

A further object is to provide a process for producing the said solidified and insolubilized compositions forming a part of the present invention, which will be capable of having their swelling characteristics, chemical characteristics, and the like, be altered or varied.

Another object is to provide a process whereby asphalts, which normally exist at room temperatures in more or less solid form or semi-solid form and which normally can be readily melted upon heating and again returned to their original solid or semi-solid state upon cooling, may be transferred into a non-melting, solid form by use of the present solidification process.

Another object is to provide a process whereby the said asphalts may be transferred into a novel physical state such that solidification and insolubilization thereof may be readily controlled to the desired extent by controlling the amount of heat and the length of heating time as well as the intensity of the heat.

Another object is to provide a process whereby the novel solidification method of the present invention may be controlled so as to permit the solidification to take place in a single or a selected plurality of operations which can take place at widely separated intervals.

Thus, it is an object of the invention to provide a process which will permit an initial, preliminary treatment which will enable a finer uniform solidification to occur readily in a desired manner.

Another object is to provide a process whereby asphalts may readily be purified or separated into components which are capable of being insolubilized on the one hand, and those components on the other hand which are incapable of being insolubilized.

Another object of the invention is to provide the foregoing novel compositions and products resultant from use and application of the foregoing processes.

A further object is to provide a process whereby asphalts may be made infusible, capable of only a limited degree of swelling, and chemically resistant to a high degree.

A further object is the provision of a process which will permit the partial solidification and insolubilization of asphalts to such extent that intermediate products can be produced which are characterized by being partially in a state of insolubilization, but are nevertheless not insoluble or infusible in bulk form. By the term insoluble I mean to include that state or condition wherein the product is incapable of forming a stable solution in the usual coal tar or petroleum solvents.

With these and other objects in view, which will be understood as the specification proceeds, I have discovered a method of insolubilizing and solidifying asphalts which comprises treating said asphalts with a potentially, free oxygen-yielding compound at a temperature sufficiently elevated to effect release of said free oxygen in said asphalts whereby to form a solidified composition which is insoluble in the usual coal tar and petroleum solvents, and which is incapable of being melted without decomposition.

The particular potentially, free oxygen-yielding catalyst compounds which may be reacted with the said asphalts to obtain the solidified and insolubilized compounds and compositions of the present invention may comprise either hydrogen peroxide or metallic peroxides or organic per compounds. One requirement of these catalysts is that they be capable of releasing active oxygen in such a free state and in such a manner that the freed oxygen is capable of acting as a catalytic agent in promoting the transformation of the initial asphalts into a solid, insoluble, non-melting state. A further requirement of the potentially oxygen-yielding peroxide catalysts is that they be capable of being uniformily distributed in the initial starting compounds which are thereby solidified and insolubilized.

The organic, potentially free oxygen-yielding catalyst compounds are generally of the alkyl, aryl, and alkyl aryl peroxide type. Thus, I have selected certain specific catalysts which are representative of the class of catalyst compounds which come within the purview of my invention. These include Diacetyl peroxide,
Tertiary butyl perbenzoate,
Di-tertiary butyl peroxide,
Tertiary butyl hydroperoxide,
Benzoyl peroxide, and
Dimethyl benzoyl hydroperoxide (cumene hydroperoxide).

Moreover, I have found that the efficiency of the transformation and the uniformity of the product can be increased by adding to either the initial compound or the catalyst or both, an additional compound which is a solvent for either the initial compound and/or the catalyst. Thus, I have found it advantageous to add toluene to tertiary butyl per-benzoate catalyst. By way of further example, dimethyl phthalate may be added to di-acetyl peroxide. In this connection, it has been found desirable to select a catalyst of the above type, the boiling point of which is in the neighborhood of the reaction temperature at which the catalyst is especially effective in releasing the free oxygen, whereby the presence of the added solvent serves to intensify the solidification.

It is indeed unexpected that hydrogen peroxide may be used as the free-oxygen yielding catalyst inasmuch as it is not oil-soluble or miscible with petroleum derivatives. However, it has long been known that asphalt may be blown with steam without decomposition of the asphalt and I have found, in the practice of this phase of my process, that it is only necessary to maintain the asphalt above the boiling point of the hydrogen peroxide so that the free oxygen is released and the water is boiled off.

In a further phase of my process, I have found that metallic peroxides may be utilized, and this discovery is also, indeed, unexpected inasmuch as the presence of metallic ions in water-insoluble natural, synthetic and mineral oils generally tends toward solubilizing and liquifying such compounds as set forth in my copending application Serial No. 33,676 filed June 17, 1948, for "Methods of Insolubilizing and Solidifying Fatty Acid Esters of Alcohols and Products Produced Thereby."

The following working examples will serve to illustrate the processes and products coming within the realm of the present invention and will also serve to illustrate the use of a representative number of the class of initial starting compounds and compositions, potentially, free oxygen-yielding catalysts, solvents, and solidified and insolubilized products covered by the present invention:

*Example 1*

A petroleum asphalt blowing flux of the grade known as 150/200 pen. was used. 200 parts of this flux were melted and 20 parts of a free oxygen-releasing catalyst; namely, t-butyl-perbenzoate were added and the compound was heated. Between about 85 to 140° C. a very heavy foaming occurred, and thereafter the compound was further heated up to around 260° C. About 200 parts of the modified substance was obtained which I have designated as product B of Example 1, in differentiating it from the initial substance which I have designated as substance A of Example 1.

This product B was physically different from substance A in that its specific gravity had slightly increased (from 1.014 to 1.018 at 60° F.), and its softening point (R and B) had also increased (in this case from 103 to 138). On the other hand, the penetration number at 77° F. was decreased considerably (in this example from 163 to 45), also the ductility (at 77° F.—5 cmf.) was changed from about 125 to about 42. There were slight decreases also in the solubility on $CS_2$ and in $CCl_4$, amounting to around 0.1%. But the solubility in 86° Bé. naphtha was decreased from 82.2% w. to 67.2% w. due to the progressing formation of insoluble substance in this reaction. The penetration index was changed from minus 1.2 to plus 0.6.

It is recognized that a petroleum asphalt of similar characteristics as those of product B can be produced by other processes also, like the process of extended air-blowing through the heated compound. One advantage of the present process is that it permits the production of such substances in a very short chemical reaction and it further permits modification of the products to almost any extent and degree desired by altering the amount of catalyst, the particular kind of free oxygen-releasing catalyst, the time of reaction, and the temperature conditions.

*Example 2*

This example illustrates the fact that the rate of modification of the initial substance A state into a less modified product B state can be controlled by selecting appropriately modified catalytic treatment conditions. The same quantity of this flux was reacted with another free oxygen - releasing catalyst of different oxygen-releasing characteristics; namely, 20 parts of t-butyl-hydroperoxide. However, other free oxygen-releasing substances can be used instead. The heating process was similar to that set forth in Example 1. Heavy foaming occurred around 115° C. The heating was continued briefly to around 225° C. and a product was obtained which I designate as state B of Example 2. Again about 200 g. modified substance was obtained.

The state B of Example 2 differed in the same respect from substance A, but to a lesser degree than product B of Example 1 differed from substance A. The specific gravity (60° F.) had increased from 1.014 to 1.015, the penetration at 770 F. had decreased from 163 to 81, and the softening point had increased from 103 to 120. The solubility of state B of this example in $CS_2$ and in $CCl_4$ was about the same as of product B of the first example, but the solubility in 86° Bé. naphtha had changed to 79.7% w. as compared to 82.2% for substance A and to 67.2% for product B in Example 1. The penetration index was changed from minus 1.2 for substance A to minus 0.3 in this example as compared to plus 0.6 for product B of the first example.

Thus, Examples 1 and 2 illustrate different forms of producing a modified product. By changing the sources or the amount of free active oxygen and by modifying the treating conditions, all desirable grades between the two examples, and even modifications beyond of that of Example 1 can be produced.

*Example 2a*

To exemplify, that as the source of free oxygen, such catalysts can be used which are not miscible with asphalt even in warm condition, the product B was produced from the substance A by heating 70 parts of asphalt blowing flux to a temperature around 90° C. Under slow mechanical stirring a flow of hydrogen peroxide, in this case in a 30% concentration, was allowed to drop into the warm composition. A total of 30 parts was used in this example. The free-oxygen was thereby released in the compound and the water was afterwards driven off by raising the temperature of the vessel slowly above the boiling point of water, to about 200° C.

A product of an increased softening point was again obtained. Part of the reaction product was further modified by a second treatment with hydrogen peroxide. Both products were later modified to full solidification in accordance with Example 5.

*Example 2b*

To exemplify that in the case of asphalt modifications, metal peroxides can also be used to modify substance A to higher modifications, such as B and C, 60 parts of asphalt blowing flux were heated under mixing and 15 parts magnesium peroxide were added. Under strong foaming, the free oxygen was released around 100° C. and the viscosity was increased. After cooling the re-softening was slowed down and some solidification was observed, although the full substance had not yet solidified. However, in treating this reaction product in accordance with Example 5, the solidification occurred even though at least some metal derivate was present in the asphalt composition.

*Example 3*

This example illustrates further modification of the product B of Example 1 to a state which is closer to actual solidification, and which will be described as state C of Example 3 or state C of Example 1. 200 parts of the product of state B of Example 1 were again combined with 20 parts of the same source of free oxygen, namely, t-butyl-perbenzoate, although other suitable sources of the free oxygen could be employed for this further modification. The compound was heated, but much less reaction occurred than was evident the first time. Heating was nevertheless quickly continued up to about 260° C. The formation of some benzoic acid crystals from the catalyst was observed.

Again, about 200 g. modified substance in this advanced state C was obtained. To show that, indeed, the process of modifying the asphalt closer to the solidification or full insolubilization point had been accomplished, and that this intermediate state was fully characterized as to the reaction product itself, the following characteristics were noted: The specific gravity had now increased from 1.014 (substance A) and 1.018 (product B) to 1.024. The penetration number at 77° F. had decreased from 163 (substance A) and 45 (product B) to 15. The softening point (ring and ball method) had increased from 103 (substance A) and 138 (product B) to 214. The penetration index had increased from minus 1.2 (substance A) and plus 0.6 (product B) to plus 4.1. The solubility of the product C in $CS_2$ and $CCl_4$ was again slightly lower (to 99.71 and 98.10% w.), but the solubility in 86° Bé. naphtha was decreased to 25.3% w. due to the further approach to the solidification state. The ductility at 77° F. was 3, compared with about 125 for substance A and 42 for product B of the same material.

These characteristics show that by controlling the rate and conditions of the reaction, asphalt compounds of a great variety of characteristics can be obtained, which can either be used as such in the usual application or further modified to meet particular requirements for specific applications.

*Example 4*

This example demonstrates that the product of one step of the modification can further be modified by reacting it with free oxygen-releasing catalysts. The product B of Example 2 was modified again with t-butyl-hydroperoxide, using 200 parts product B of Example 2 with 20 parts catalyst.

In this case, less foaming was observed in the second treatment than in the first one. The heating was continued to and above 225° C. until about 200 g. modified substance was obtained. However, the heating may be continued further and a current of air, steam or oxygen may be blown through the substance in order to remove any by-products formed from the catalytic treatment or to further modify the material.

This state C of this example and Example 2 was compared with state B of this example and with the state C of Examples 1-3. The direction of the process was again identical with and progressed more slowly than the other examples. State 3 of this example had a specific gravity of 1.021 compared with 1.014 (state A): 1.015 (state B) and compared with state C of the other examples with 1.024.

The penetration at 77° F. was 41, the softening point 139, the penetration index plus 0.5. The solubility in $CS_2$ and in $CCl_4$ was lowered only slightly as compared to state B, but the solubility in 86° Bé. naphtha was lowered to 57.2% w. Generally it has been observed that the physical characteristics of the state C of Examples 2 and 4 are quite similar to those of state B of Examples 1-3. This shows that the whole range of modifications can be obtained by proper application of the process of this invention, and that such intermediates can be produced in all grades, such as a state D and E and so on, before an actual solidification and insolubilization is reached.

The sequence of the stages may be slow (that is, the material can be allowed to cool after a particular state is reached and it can be stored for some time between the steps, etc.) or the steps may follow each other so rapidly that the process has the appearance of a continuous process. This can be done by adding the readily free oxygen-releasing catalyst in a stream, the flow of which can be readily controlled. The oxygen-releasing catalyst can be added by itself or in solutions, in dispersions, or in emulsions, or in any convenient form which might be chosen as the most suitable one for a certain application.

*Example 5*

This example shows the carrying through of the process to the actual formation of the solid, insoluble, infusible product.

In this particular example the state C product of Examples 1-3 was used and the same source of active, free oxygen, t-butyl-perbenzoate was utilized, although other sources of free, active oxygen can be applied accordingly.

The product of state C was prepared as described in Example 3 and it was allowed to cool to about 95° C. Then, another amount of about 8% of the catalyst was added and the mass was again heated. In this heating, a gel-condition became visible for a short time, which was followed rapidly with the occurrence of popcorn-like solidifications.

In heating this product with toluene and with petroleum solvent, the remaining soluble substance went into solution and the solidification could be filtered off. An additional purification was accomplished by several treatments with ether petroleum. The substance may also be freed from water soluble impurities by heating it in water and then drying at around and above 100° C. About 41.6% of the initial material (state A) was obtained after the purifications and drying.

The final product had a coal-like appearance, and it appeared to swell somewhat in contact with coal-tar solvents, petroleum naphthas, and mono-styrene, although it did not form a coherent gel with these usual swelling agents.

Its chemical composition was tested by analysis and compared with that of the state A of the same material. The solidifications were slightly lower in carbon (about 83.4% C against 84.92% C for state A) and lower in hydrogen (about 8.6% H against 10.46% H for state A). However, it must be kept in mind, that the material in state C is not a chemically pure substance, and that the difference in these analyses may be caused in some part by the presence of a small amount of state A substance which has not turned insoluble in the process, and which might therefore no longer exist in the purified substance of the solidified material. However, these physical structure problems are merely of collateral interest and are of importance in the application of the present invention to industrial uses.

*Example 6*

This example shows that for the application of this invention it is not necessary to start with the solidification and modification of the substance from the early state of the asphalts, like those which are commercially classified as blowing fluxes. Other asphalts and other states of asphalt treatments may be used for the application of this invention, even where pre-treatment has been accomplished by other processes and in other forms.

The following working examples are illustrative in this connection:

(a) 27 parts commercial "Blown (oxidized) Paraffinic Asphalt" were softened by warming with 9 parts toluene into some degree of solution. 3 parts t-butyl-perbenzoate catalyst were added slowly and the mixture was heated. The toluene evaporated around 125/130° C. and solidification occurred about 150° C. The reaction product was then purified by heating it with toluene and filtering it. After drying, 18 g. solid dry substance was obtained, showing that in this case the solidification was produced in one operation directly from the commercial pretreated material.

(b) In another application, 39 parts of the same commercial blown asphalt were liquified by warming with 6 parts toluene and as a source of free, active oxygen 1.5 parts of a benzoyl peroxide compound was used (the commercial Luperco As, which is a modification of 95% benzoyl peroxide with stearic acid). At about the temperature when the toluene evaporated in the heating, a reaction occurred, but no solidification became visible, even around 180° C. In the second treatment, 15 parts toluene were added, and again 3 parts of the same source of free oxygen were applied. This time, at around 160° C., a jelly-like condition occurred and the product was partially soluble, partially insoluble in toluene. The solidified, insoluble part was filtered off, washed twice with benzol and with hexane, and then dried. 13.5 parts dry substance were obtained. It was softer in texture than the product of part (a) of this example.

(c) As another example for the possible application of this invention to different grades of asphalts and different sources of free oxygen, 33 parts of a commercial "Coating Asphalt for Built up Roofs" were softened by warming with 3 parts toluene and 4.5 parts di-tertiary butyl peroxide were added. After the reaction had quieted down, heating was continued to about 225° C. The so-modified material was again heated with 3 parts of the same source of free oxygen and at around 180° C., a partial insolubilization occurred. Heating was discontinued at around 210° C.

The reaction product was only partially soluble in 15 parts hot toluene, but by adding 4.5 t-butyl-perbenzoate immediately upon evaporation of the solvent, instantaneous solidification occurred and after boiling the reaction product with benzol and with ether petroleum and drying the insoluble substance which remained on the filter, 24 g. dry solid substance was obtained which was about 72.7% of the applied asphalt.

*Example 7*

(a) 57 g. asphalt (blow flux) were heated with 8 parts acetyl peroxide in dimethyl phthalate (that is 2.7 parts acetyl peroxide). Some reaction occurred at about and above 90° C. Heating was continued to around 200° C. The reaction product was viscous like the initial blown asphalt. To the hot compound (around 90° C.) 16 more parts of the same mixture (5.33 parts acetyl peroxide) was slowly dropped under continuous stirring. The progressed insolubilization was tested by dissolving a part of the product in toluene and precipitating the insolubilized substance with ether petroleum. Nearly all the black asphalt substance remained on a filter and the filtrate had a translucent amber color. Compared with this, the initial asphalt under the same test condition exhibited very little solid substance on the filter paper and gave an almost black filtrate.

(b) 62.5 parts asphalt blowing flux were heated with 10 parts commercial 68.1% cumene hydroperoxide (the rest being dimethyl-benzyl-alcohol and acetophenone). Around 150° C. a strong reaction occurred and the temperature rose easily to about 200° C. The reaction product had about the same characteristics after cooling as a commercial blown asphalt which had been blown at the usual high temperatures for a considerable number of hours.

Additional cumene hydroperoxide was slowly dropped under stirring in the hot compound (at around 150° C.) and a violet reaction was maintained, whereby solidification and insolubilization in hot toluene was achieved for a major portion of the initial substance. The remaining partially soluble portion was separated from the solids by solvent treatment.

As set forth in the preceding working examples, it will be understood that the present solidification process can be applied to such extent that actual solidification; that is, actual formation of an insoluble product is obtained which can be isolated in the form of insoluble particles. This isolation may be accomplished by treatment with solvents, such as coal tar or petroleum solvents. The insoluble particles are of such character that they do not exhibit any film forming characteristics even when they are in a swollen condition.

On the other hand, the present invention has found particular utility in the formation of products of various intermediate stages of insolubilization, which intermediate products are adapted for use as coating, impregnating and filling compositions. Moreover, these intermediate products may be modified by increasing their content of insolubilized substance.

While it is not desired to be restricted to any particular theory, factual evidence as shown by the preceding working examples clearly shows that these modifications are, indeed, intermediate stages on the way from soluble or near soluble stages to an insoluble or nearly insoluble stage for the reason that the modifications require less additional treatment for achieving solidification than do the preceding intermediate stages.

Furthermore, comparative tests of the foregoing initial petroleum asphalt blow fluxes, the intermediate stages and the final insolubilized stages with known soluble, partially insoluble and completely insoluble oils, fats and waxes under a Geiger counter X-ray diffraction spectrometer show similar changes in the spectra at similar positions. This indicates that the initial petroleum asphalt blow flux has a spectrum similar to an oil film; a blown asphalt has a spectrum similar to an oil-gel and the asphalt solidifications of the present invention have spectra similar to insolubilized, oil, fat and wax-solidification products.

Thus, the present invention makes it possible to produce intermediate stages having predetermined characteristics, such as any grade of solubility, penetration number, penetration index, softening point, etc., between the limits of the initial asphalt substance and the final stage of insolubilization.

Accordingly, the present invention makes it possible to produce coating asphalts, roofing asphalts, asphalt impregnating compounds, asphalt compounds for electrical insulation purposes, for batteries, transformers, and other electrical equipment, for use on tile, metal, paper, textiles, etc., in a minimum of time, with a minimum of expense and under consistent and controllable conditions. By virtue of the foregoing, it will be apparent that the present invention offers a substantial improvement over the prior art practices of steam-blowing or air-blowing or heat-treating of asphalts for periods ranging from 6 to 20 hours or more at temperatures in the neighborhood of 250 to 300° C., particularly since it is not possible to achieve true insolubilization or a non-melting state by these prior art practices.

I claim:

1. A process for modifying, solidifying and insolubilizing asphalts which comprises treating said asphalts with not less than about 4 per cent by weight of a peroxide selected from the group consisting of hydrogen, alkyl, aryl and alkyl aryl peroxide at a temperature sufficient to effect the release of free oxygen in said asphalt whereby to obtain a solidified asphalt which is insoluble in naphtha and toluene.

2. The process set forth in claim 1 wherein the peroxide comprises hydrogen peroxide.

3. The process set forth in claim 1 wherein the peroxide comprises an alkyl peroxide.

4. The process set forth in claim 1 wherein the peroxide comprises an aryl peroxide.

5. The process set forth in claim 1 wherein the peroxide comprises an alkyl aryl peroxide.

6. The process set forth in claim 3 wherein the alkyl peroxide comprises tertiary butyl hydroperoxide.

7. The process set forth in claim 3 wherein the alkyl peroxide comprises di-tertiary butyl peroxide.

8. The process set forth in claim 3 wherein the alkyl peroxide comprises diacetyl peroxide.

9. The process set forth in claim 4 wherein the aryl peroxide comprises benzoyl peroxide.

10. The process set forth in claim 5 wherein the alkyl aryl peroxide comprises tertiary butyl perbenzoate.

11. The process set forth in claim 5 wherein the alkyl aryl peroxide comprises cumene hydroperoxide.

12. A process for modifying, solidifying and insolubilizing asphalts which comprises treating said asphalts with not less than about 4 per cent by weight of a peroxide selected from the group consisting of hydrogen, alkyl, aryl and alkyl aryl peroxide in the presence of a solvent for said asphalts at a temperature sufficient to effect the release of free oxygen in said asphalt whereby to obtain a solidified asphalt which is insoluble in said solvent and in naphtha and toluene.

13. The process set forth in claim 12 wherein the peroxide is hydrogen peroxide.

14. The process set forth in claim 12 wherein the peroxide is an alkyl peroxide.

15. The process set forth in claim 12 wherein the peroxide is an aryl peroxide.

16. The process set forth in claim 12 wherein the peroxide is an alkyl aryl peroxide.

MAX KRONSTEIN.

REFERENCES CITED

The following references are of record in the file of this patent:

UNITED STATES PATENTS

| Number | Name | Date |
|---|---|---|
| 2,179,208 | Burk et al. | Nov. 7, 1939 |
| 2,281,728 | Thelen | May 5, 1942 |
| 2,465,960 | Berge | Mar. 29, 1949 |

FOREIGN PATENTS

| Number | Country | Date |
|---|---|---|
| 26,426 of 1912 | Great Britain | Aug. 14, 1913 |
| 229,690 | Great Britain | Dec. 3, 1925 |
| 427,777 | Great Britain | Apr. 30, 1935 |

OTHER REFERENCES

Jour. Am. Chem. Soc., vol. 68 (1946), pages 642–644. Article by Milas et al.

Certificate of Correction

Patent No. 2,560,650                                            July 17, 1951

MAX KRONSTEIN

It is hereby certified that error appears in the printed specification of the above numbered patent requiring correction as follows:

Column 1, line 3, strike out "and now abandoned";

and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*